(12) United States Patent
Hill

(10) Patent No.: US 7,232,400 B2
(45) Date of Patent: Jun. 19, 2007

(54) TWO SPEED TRANSMISSION

(75) Inventor: Richard Hill, Shropshire (GB)

(73) Assignee: Perkins Engines Company Limited, Peterborough (GB)

( * ) Notice: Subject to any disclaimer, the term of this patent is extended or adjusted under 35 U.S.C. 154(b) by 153 days.

(21) Appl. No.: 10/911,719

(22) Filed: Aug. 5, 2004

(65) Prior Publication Data

US 2005/0032604 A1 Feb. 10, 2005

(30) Foreign Application Priority Data

Aug. 9, 2003 (EP) .................................. 03254970

(51) Int. Cl.
*F16H 3/44* (2006.01)

(52) U.S. Cl. .................................... 475/299

(58) Field of Classification Search ................ 180/343, 180/371, 372; 475/298, 299, 300, 282, 303
See application file for complete search history.

(56) References Cited

U.S. PATENT DOCUMENTS

| 1,407,226 A | 2/1922 | Schubert |
| 3,184,994 A * | 5/1965 | Stahl ........................ 475/286 |
| 4,040,309 A | 8/1977 | Wood et al. |
| 4,215,593 A | 8/1980 | Shono et al. |
| 4,589,304 A | 5/1986 | Ashikawa et al. |
| 4,667,538 A | 5/1987 | Larson |
| 4,779,699 A | 10/1988 | Hatano |
| 5,168,946 A | 12/1992 | Dorgan |
| 5,186,946 A | 2/1993 | Valliéres |
| 5,195,600 A | 3/1993 | Dorgan |
| 5,226,339 A | 7/1993 | Donato et al. |
| 5,509,491 A | 4/1996 | Hall, III |
| 5,533,943 A | 7/1996 | Ichioka et al. |
| 5,813,488 A | 9/1998 | Weiss |
| 5,919,109 A | 7/1999 | Fleckenstein |
| 6,796,921 B1 * | 9/2004 | Buck et al. .................. 475/299 |
| 2001/0024990 A1 | 9/2001 | Witzenberger |

FOREIGN PATENT DOCUMENTS

GB 2 361 898 A 11/2001

OTHER PUBLICATIONS

Yeaple F., "Planetary Gears Take on New Jobs", Product Engineering, vol. 50, No. 5, May 1979, pp. 37-41.

* cited by examiner

*Primary Examiner*—Dirk Wright
(74) *Attorney, Agent, or Firm*—Finnegan, Henderson, Farabow, Garrett & Dunner

(57) ABSTRACT

The present invention provides a final drive for a vehicle including a compound gear set comprising an input, an output and first and second epicyclic gear sets, each epicyclic gear set comprising a sun gear, at least one planet gear, a planet carrier and a ring gear. The sun gear of the first epicyclic gear set in the final drive is rotatably coupled with the ring gear of the second epicyclic gear set.

The final drive finds particular application in tracked vehicles which must be able to operate at both low torque, high speed and high torque, low speed conditions, for example in earth moving applications. Use of one or more final drives in a tracked vehicle gives the ability to operate in these two conditions without the need for potentially complicated and expensive modification of the tracked vehicle's present transmission.

23 Claims, 9 Drawing Sheets

TWO SPEED TRANSMISSION

TECHNICAL FIELD

This invention relates to two speed transmissions. It is particularly, but not exclusively, applicable to two speed transmissions used in final drives for tracked vehicles.

BACKGROUND

In vehicle applications it is often necessary to provide further gearing between the engine and a vehicle's wheels in addition to the vehicle's main gearbox.

One example of such further gearing can be found on permanent four wheel drive vehicles. Permanent four wheel drive vehicles conventionally have an additional gear selector for selection between high range for normal driving and low range. In low range the vehicle speed is reduced while the engine speed remains much the same and consequently the torque at the wheels is increased for off road driving.

Tracked vehicles may also utilise two ratios, a high ratio for travelling speeds and a low ratio for working speeds. However, conventional primary four speed transmissions do not allow a vehicle to both travel at high speeds (over 70 kph) and to operate at high torque at low speeds (4 kph or less), during applications such as earth moving. To modify such a primary four speed transmission would be expensive.

This invention provides a transmission arrangement that permits both high speed travel and high torque, low speed operation.

SUMMARY OF THE INVENTION

The present invention provides a final drive for a vehicle including a compound gear set comprising an input, an output, and first and second epicyclic gear sets, each epicyclic gear set comprising a sun gear, at least one planet gear, a planet carrier and a ring gear. The sun gear of the first epicyclic gear set in the final drive is rotatably coupled with the ring gear of the second epicyclic gear set.

The present invention also provides a compound gear set comprising an input, an output, and first and second epicyclic gear sets, each epicyclic gear set comprising a sun gear, at least one planet gear, a planet carrier and a ring gear. The sun gear of the first epicyclic gear set is rotatably coupled with the ring gear of the second epicyclic gear set. The compound gear set is operable between a high ratio state in which the sun gear and the ring gear of the first epicyclic gear set are locked against rotation and a low ratio state in which the planet carrier of the second epicyclic gear set is rotatably coupled to the ring gear of the first epicyclic gear set.

Other aspects and features of this invention will be apparent from the following description and the accompanying drawings.

DETAILED DESCRIPTION

Figure 1:
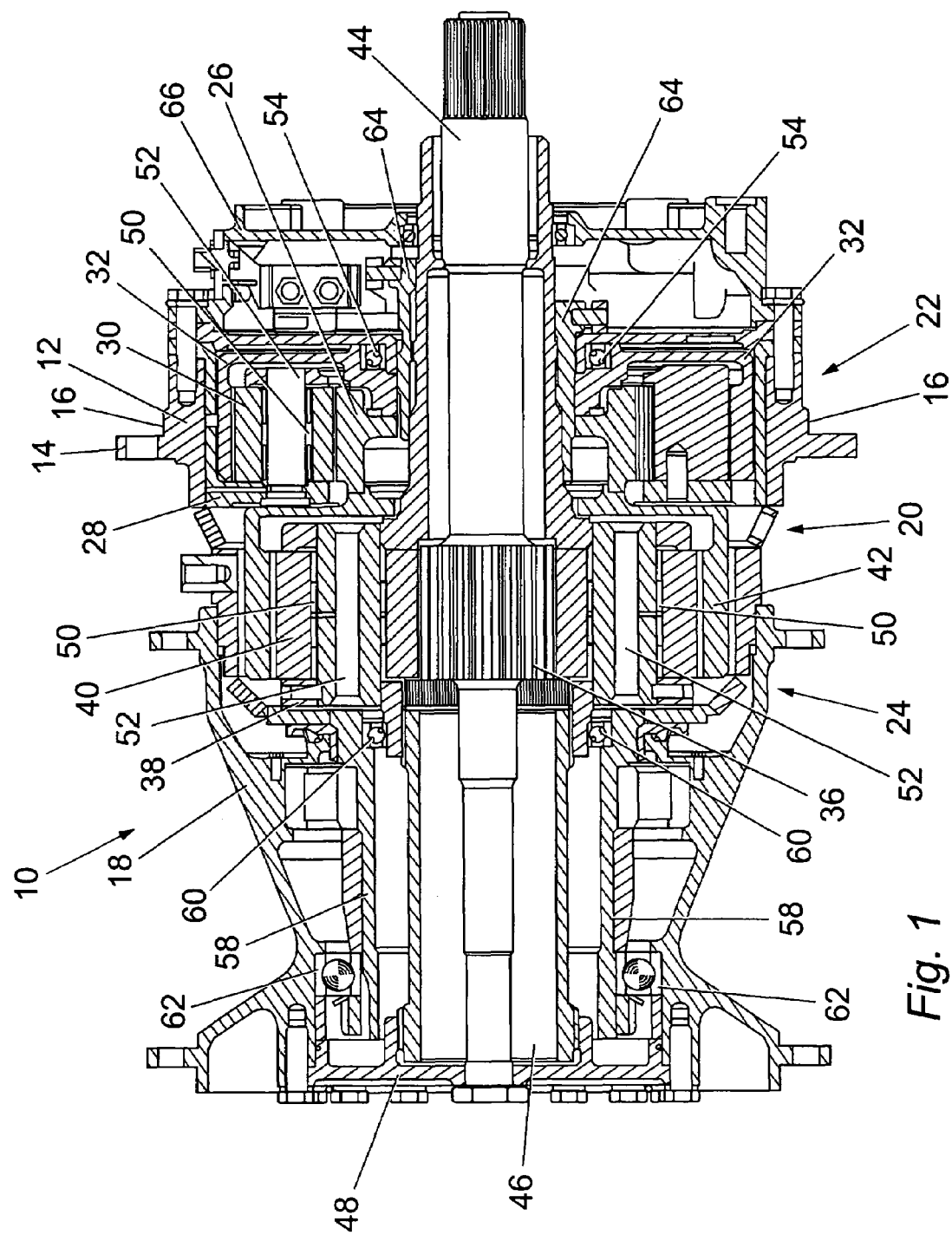
FIG. 1 is a cross-sectional view of a final drive according to a first embodiment of the present invention.

Referring to the drawings, two embodiments of the present invention will now be described, by way of example only.

FIG. 1 shows a final drive for a tracked vehicle generally referred to as 10. Although the final drive 10 is described in connection with a tracked vehicle, it may also be useful with a wheel-drive vehicle. The final drive 10 includes a housing 12, a mounting flange 14, a mounting spigot 16 and a sprocket drum 18. A compound gear set 20 is located within the housing 12. The compound gear set 20 comprises a first epicylcic gear set 22 and second epicyclic gear set 24.

The first epicyclic gear set 22 has a first epicyclic sun gear 26, first epicyclic planet carrier 28, seven or another suitable number of first epicyclic planetary gears 30 and a first epicyclic ring gear 32. The first epicyclic planet carrier 26 is preferably a two piece design and the two pieces are secured together by dowels and bolts (not shown). The second epicyclic gear set 24 has a second epicyclic sun gear 36, second epicyclic planet carrier 38, four or another suitable number of second epicyclic planet gears 40 and a second epicyclic ring gear 42.

The first epicyclic sun gear 26 and second epicyclic ring gear 42 are rotatably coupled together. It will be understood that "rotatably coupled" means that coupled components rotate at the same speed. In this case the coupling is permanent and is achieved by welding the two components together. It will be understood to those skilled in the art that the rotational coupling may be achieved by any suitable method and may be, for example, by a spline connection or by using a unitary sun gear and ring gear component. A compact design is achieved by the use of welding and avoids the need to use splines with their potential for wear and misalignment.

An input shaft 44 is mounted within the final drive 10 and is rotatably coupled to the second epicyclic sun gear 36.

The first epicyclic planet carrier 28 is permanently grounded and does not rotate.

The second epicyclic planet carrier 38 is rotatably coupled to a stub shaft 46 which in turn is rotatably coupled to a drive cover 48. The second epicyclic planet carrier is connected to the stub shaft 46 by splines. The stub shaft 46 is bolted to the drive cover 48.

The drive cover 48 is in turn rotatably coupled to the sprocket drum 18 by bolting.

Bearings are employed throughout the final drive 10 to allow rotation of the various components. Planet bearings 50 are caged needle roller assemblies and are mounted around planet pins 52 to allow rotation of the individual planetary gears 30,40. The planet pins 52 are headless.

The first epicyclic ring gear 32 is mounted on and rotates on a first epicyclic single row ball bearing 54 which itself is carried on a first epicyclic single row ball bearing support 56.

A sprocket carrier 58 is also included and is mounted around the stub shaft 46. The sprocket carrier 58 is a twin flange conical drum. Sprocket carrier bearings 60 are located between the stub shaft 46 and the sprocket carrier 58. Sprocket drum bearings 62 are located between the sprocket carrier 58 and the sprocket drum 18.

A range change sleeve 64 is also included within the final drive 10. The range change sleeve 64 is mounted around the input shaft 44. Splines are present on the range change sleeve 64 on the end nearest the compound gear set 20. The range change sleeve 64 can slide along the input shaft 44 and is moved by a swinging fork or other suitable hydraulic, pneumatic, mechanical or electrical arrangement (not shown).

A range change housing 66 encloses the range change sleeve 64 within the final drive 10.

The final drive 10 is mounted to a tracked or wheel-driven vehicle 68 by bolts inserted through the mounting flange 14. The mounting spigot 16 allows the final drive to be correctly located onto the tracked vehicle 68.

Figure 5:
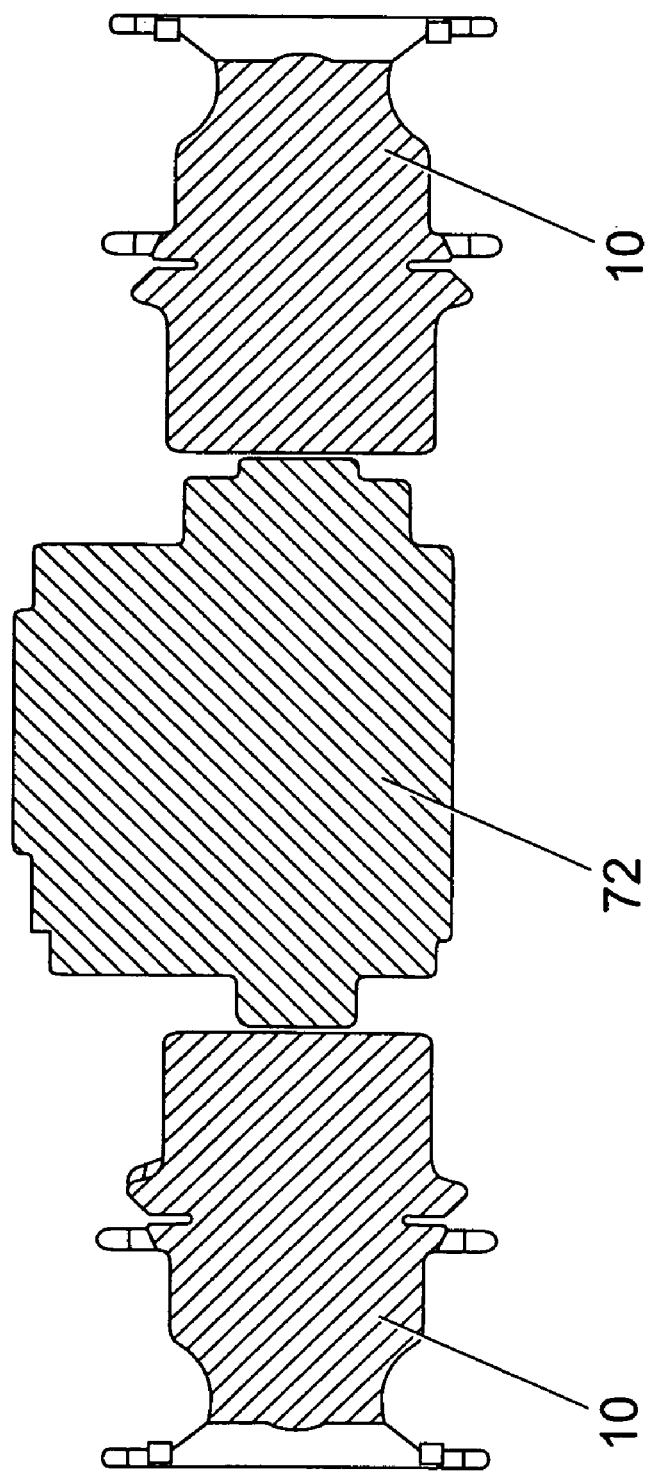
FIG. 5 is a diagrammatic, end sectional view of a drive train comprising a multi-speed transmission and two final drives of FIG. 1.
Figure 6:
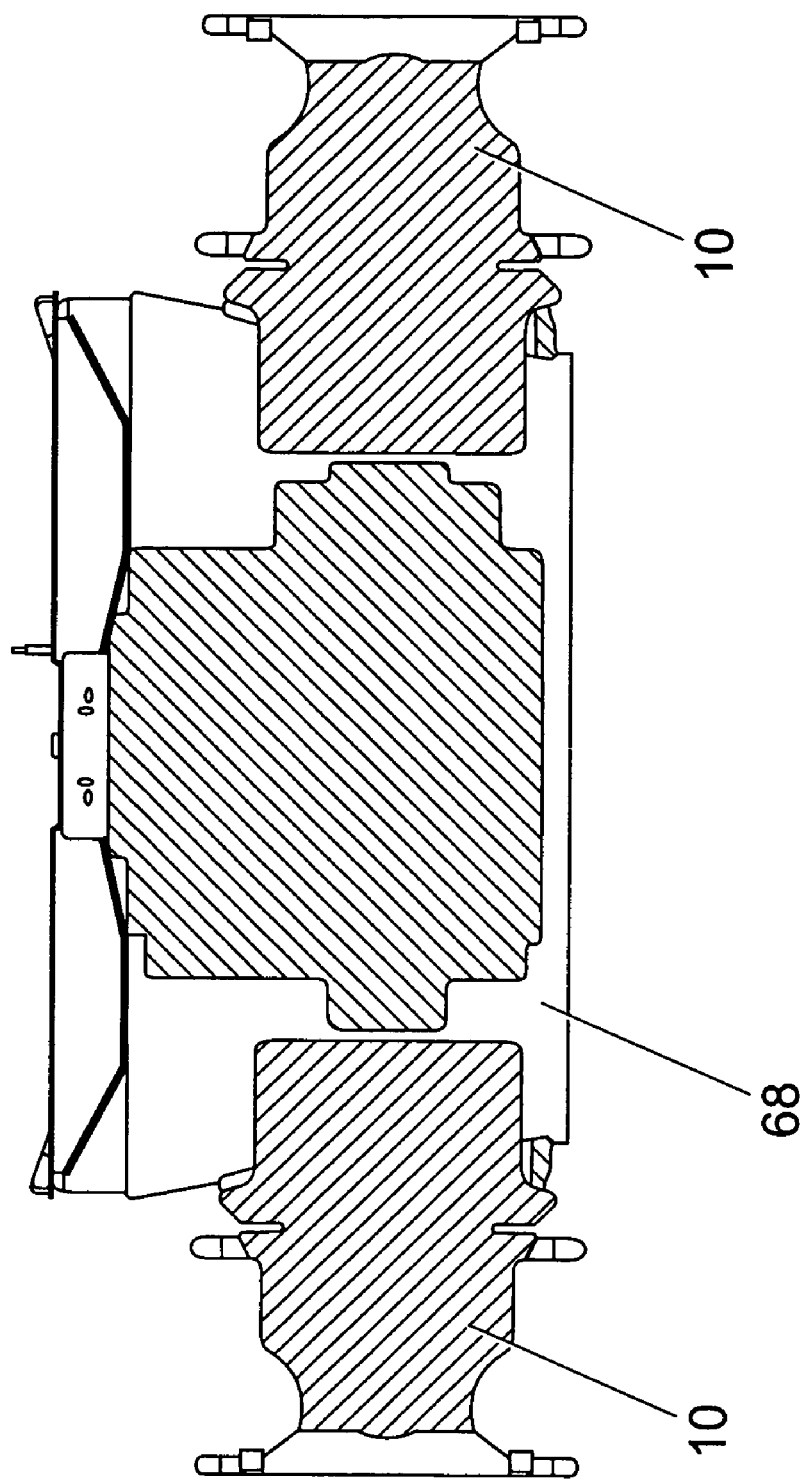
FIG. 6 is a diagrammatic, end sectional view of the hull of a tracked vehicle with the drive of FIG. 1 attached to each side.

FIG. 5 shows the drive train 70 of the tracked vehicle 100. The drive train comprises a multi-speed transmission 72 and two final drives 10. The output of the transmission 72 provides rotational input to the final drives 10. The transmission in this case is preferably our Model X-300 four-speed transmission. The transmission may be shifted either manually or automatically. It may also be any other transmission suitable for the purpose with either automatic or manual shifting, or may even be a Continuously Variable Transmission (CVT).

Figure 7:
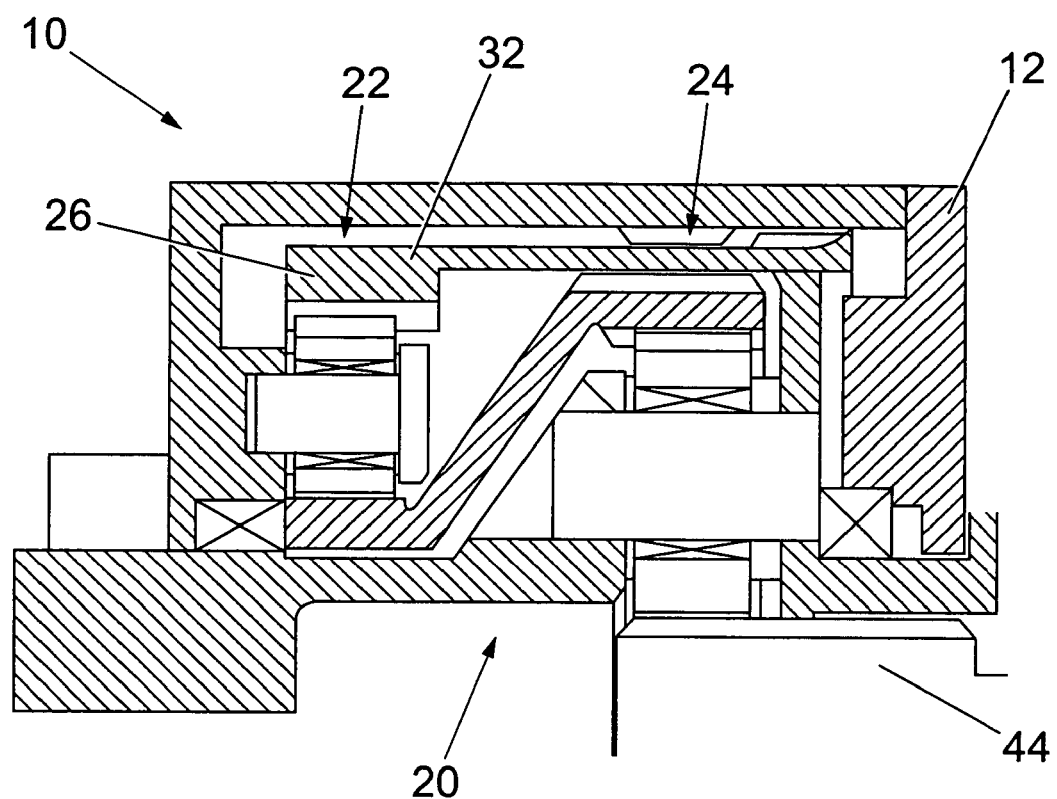
FIG. 7 is a cross-sectional view of a final drive according to a second embodiment of the present invention.

FIG. 7 shows a second embodiment of the invention. In the second embodiment there is also provided a final drive referred to as 10. It will be understood that identical elements have identical reference numbers to the first embodiment unless indicated below.

The second embodiment has several differences to the first embodiment. Most of these differences are immaterial to the operation of the final drive 10. The main differences are the omission of the separate range change sleeve 64 and that the first epicyclic ring gear 26 is able to move axially along the central axis of the input shaft 44. Splines are also provided on the first epicyclic ring gear 32. A movement mechanism (not shown) is also provided to allow axial movement of the first epicyclic ring gear 32. An auxiliary brake 74 is also provided.

INDUSTRIAL APPLICABILITY

The range change sleeve 64 of the first embodiment shown in FIG. 1 has three positions: a low ratio position, a high ratio position and a neutral position.

Figure 2:
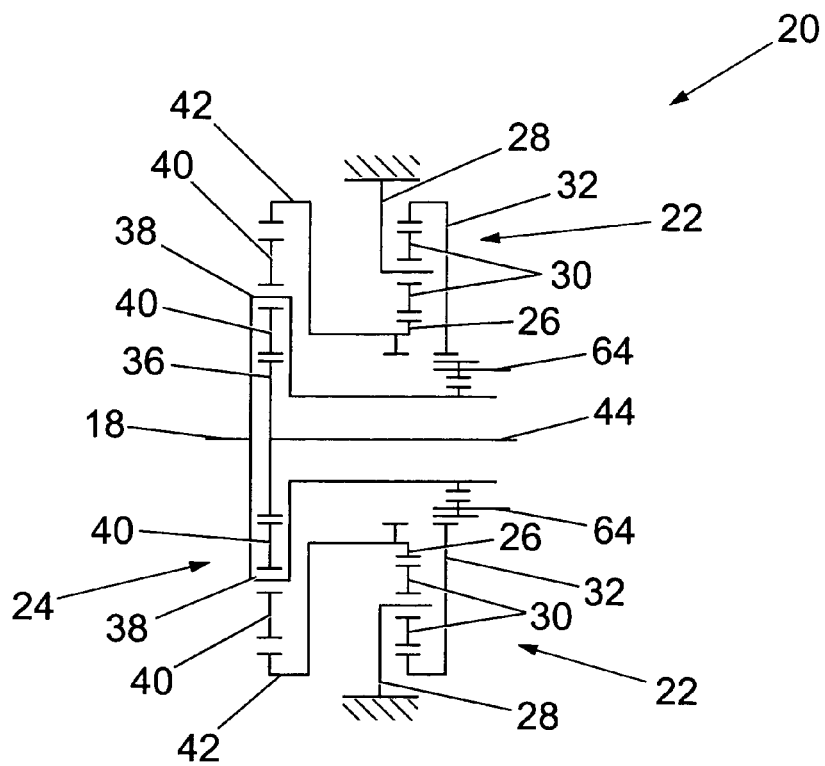
FIG. 2 is a schematic representation of the final drive of FIG. 1 in a low ratio position.

In the low ratio position shown in FIG. 2 the range change sleeve 64 is moved forward towards the compound gear set 20. The splines of the range change sleeve 64 lock the second epicyclic planet carrier 38 to the first epicyclic ring gear 32. Since the second epicyclic planet carrier 38 is rotatably coupled to the output of the system (the sprocket drum 18), the first epicyclic ring gear 32 must rotate at the same speed as the sprocket drum 18. Furthermore, since the first epicyclic planet carrier 28 is permanently grounded and cannot rotate, the first epicyclic planetary gears 30 cause the first epicyclic sun gear 26 to rotate which in turn causes the second epicyclic ring gear 42 to rotate. The second epicyclic planetary gears 40 rotate around the rotating second epicyclic ring gear 42. This reduces the rotational speed of the second epicyclic planet carrier 38 and consequently the rotational speed of the sprocket drum 18. Thus both the first and second epicyclic gear sets 22,24 rotate to some degree in low ratio.

Figure 3:
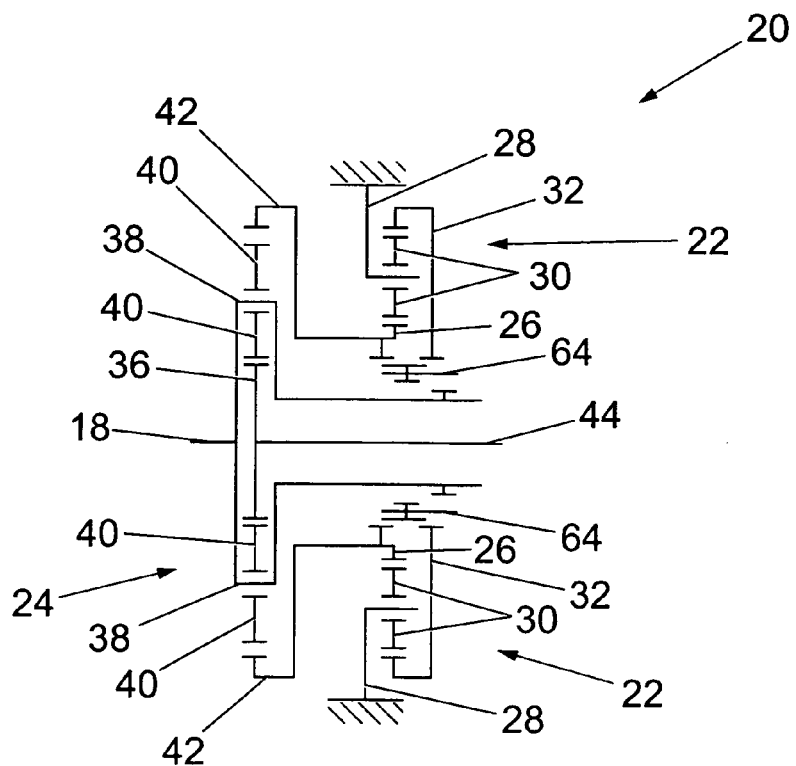
FIG. 3 is a schematic representation of the final drive of FIG. 1 in a high ratio position.

In the high ratio position shown in FIG. 3 the range change sleeve 64 is moved back from the compound gear set 20. The splines of the range change sleeve 64 lock the first epicyclic sun gear 26 to the first epicyclic ring gear 32 and maintain them stationary. Since the first epicyclic planet carrier 28 is permanently grounded and does not rotate, the first epicyclic gear set 22 does not rotate at all in high ratio. The second epicyclic ring gear 42 is also stationary since it is rotatably coupled to the first epicyclic sun gear 26. High ratio is determined only by the secondary epicyclic planetary carrier 38.

Figure 4:
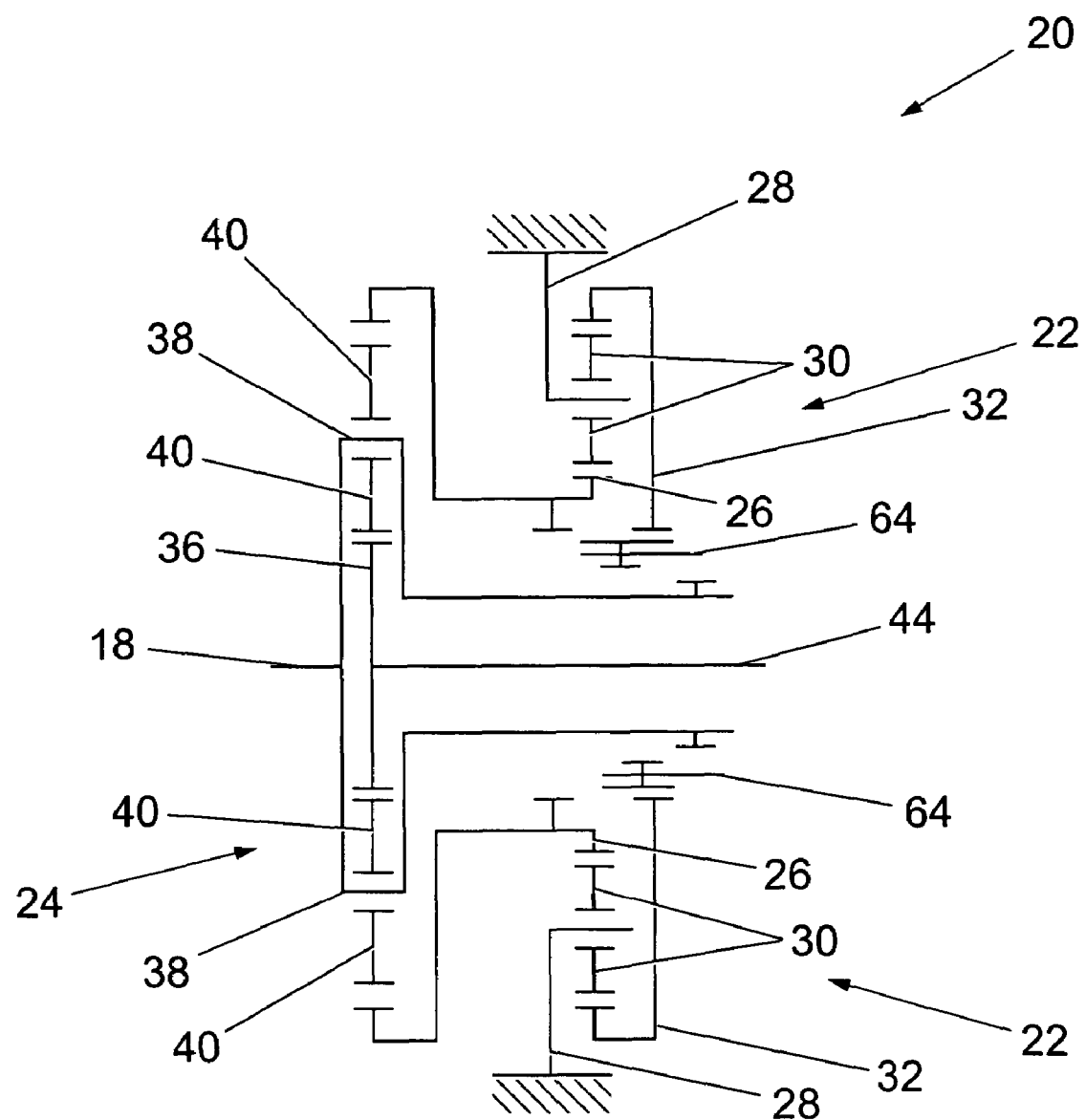
FIG. 4 is a schematic representation of the final drive of FIG. 1 in a neutral position.

In the neutral position shown in FIG. 4 the sleeve is in a position between the high ratio and low ratio positions and effectively disconnects the input shaft 44 from the sprocket drum 18.

The first epicyclic ring gear 32 of the second embodiment shown in FIG. 7 also has three positions: a low ratio position, a high ratio position and a neutral position.

Figure 8:
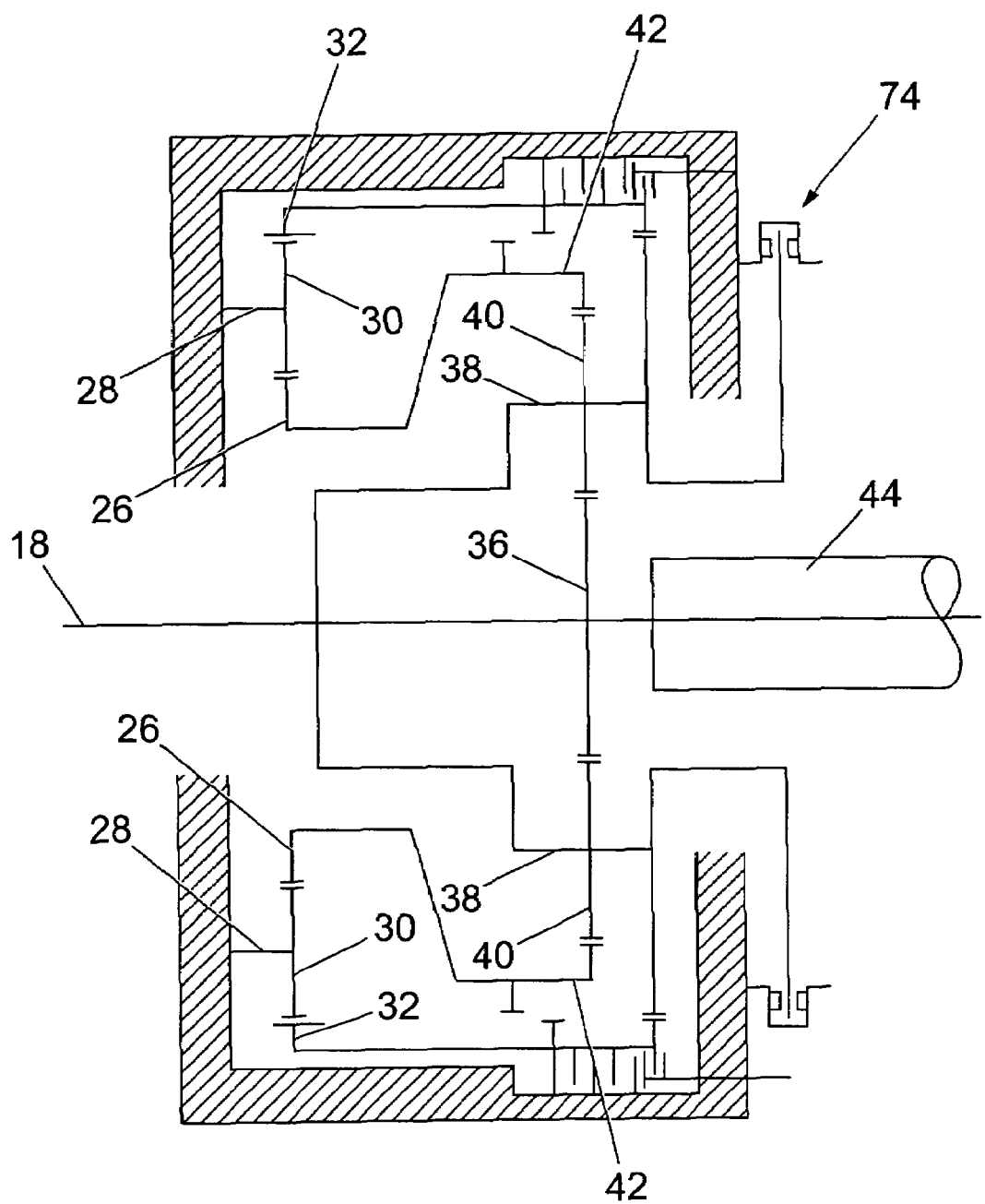
FIG. 8 is a schematic representation of the final drive of FIG. 6 in a low ratio position.

In the low ratio position shown in FIG. 8 the first epicyclic ring gear 32 is in a position midway between the high and neutral positions. The splines located on the first epicyclic ring gear 32 lock the various components together as they are described above in relation to the low ratio position of the first embodiment.

Figure 9:
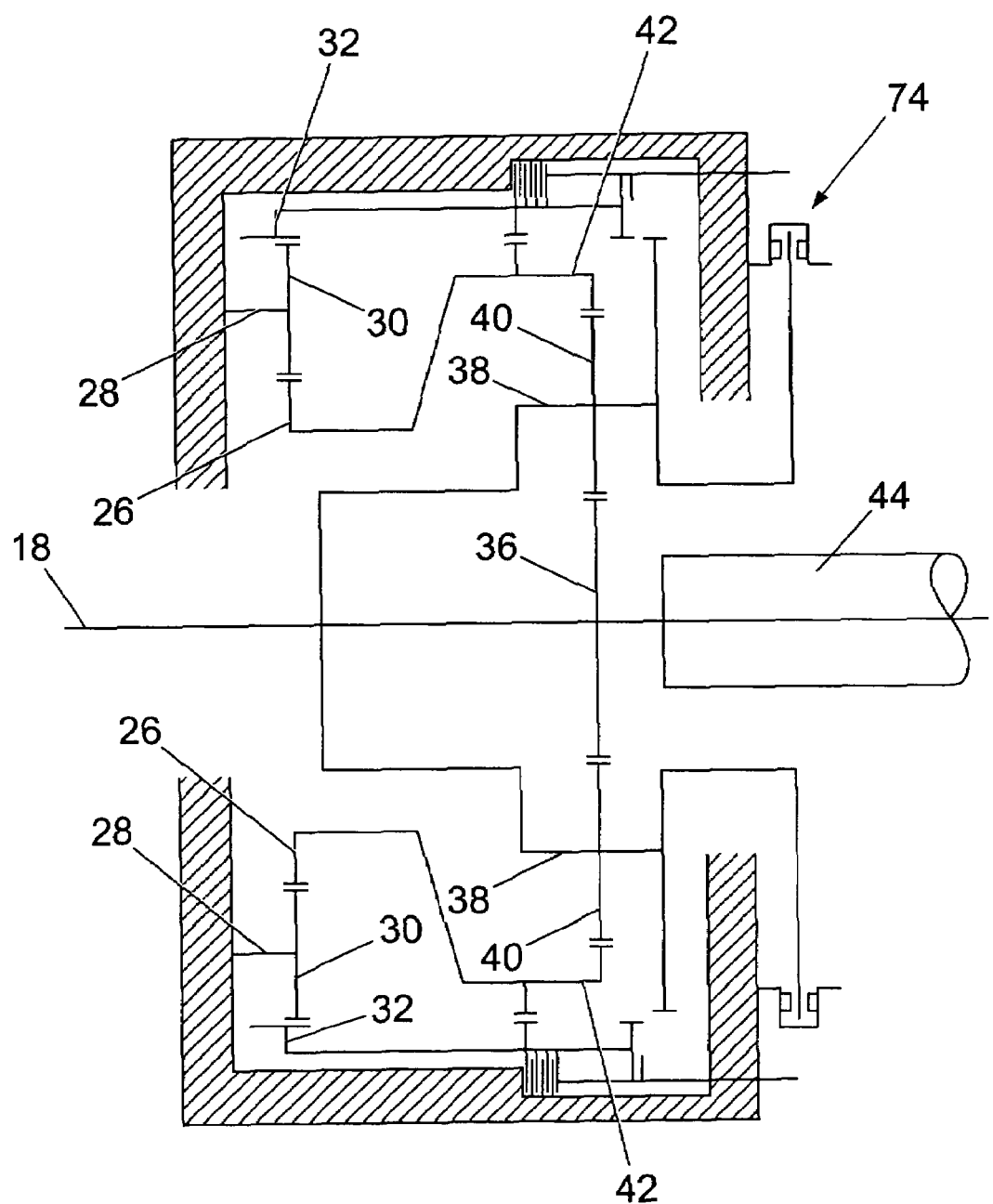
FIG. 9 is a schematic representation of the final drive of FIG. 6 in a high ratio position.

In the high ratio position shown in FIG. 9 the first epicyclic ring gear 32 is moved toward the output of the system (the sprocket drum 18). The splines located on the first-epicyclic ring gear 32 lock the various components together as they are described above in relation to the high ratio position of the first embodiment.

Figure 10:
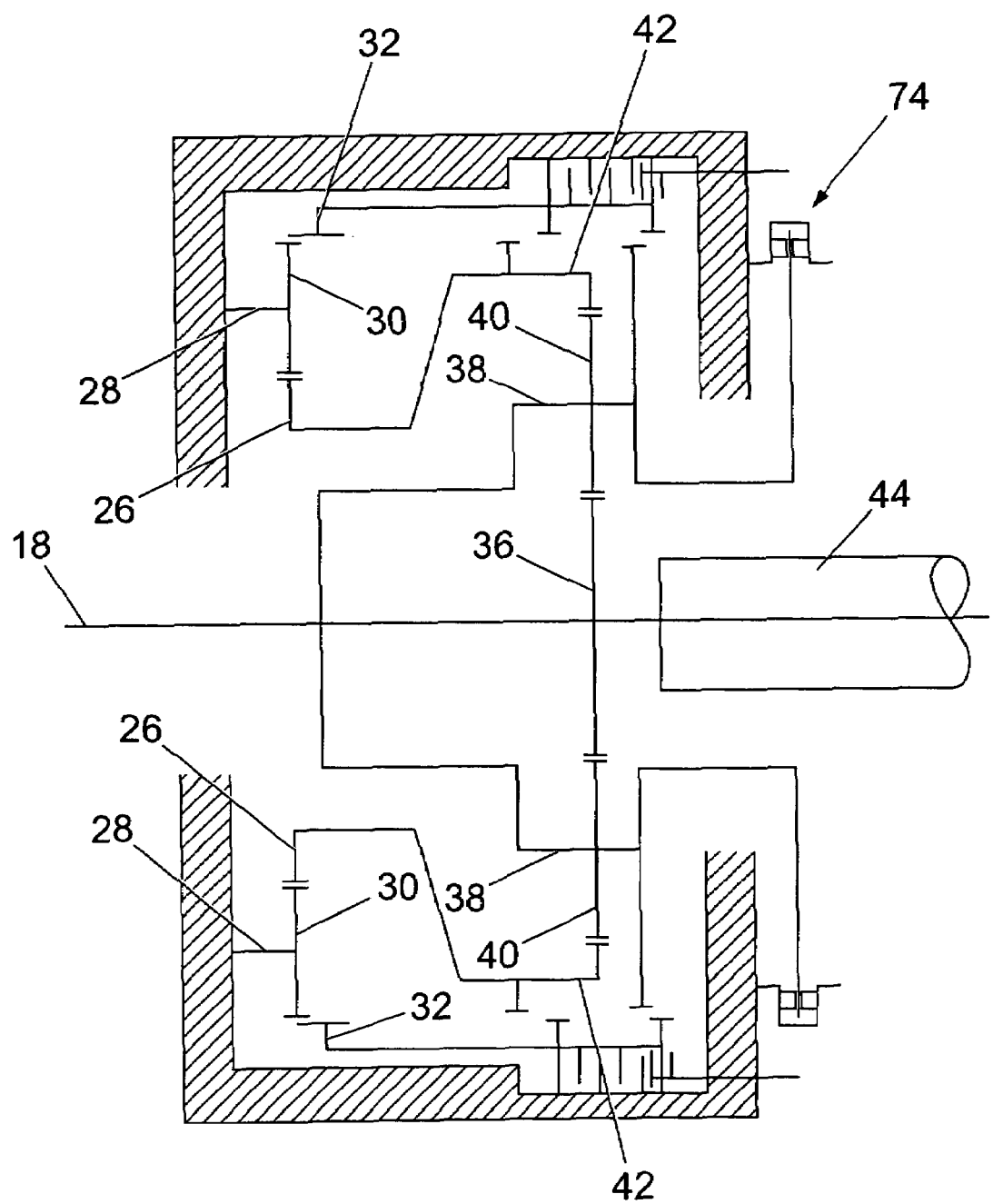
FIG. 10 is a schematic representation of the final drive of FIG. 6 in a neutral position.

In the neutral position shown in FIG. 10 the first epicyclic ring gear 32 is moved toward the input shaft 44. The neutral position effectively disconnects the input shaft 44 from the sprocket drum 18.

The auxiliary brake 74 is shown as activated in the neutral position. This impedes movement of the tracked vehicle 68 when range changes are being made on sloped ground.

The torque in the final drive 10 in low ratio is split between the first and second epicyclic gear sets 22,24. This gives the benefit of reduced weight and increased efficiency over using a series reduction gear set.

It is to be understood that the invention is not limited to the embodiment described herein but may be modified in both construction and detail.

The final drive of the invention finds particular application in a tracked or other vehicle which must be able to operate at both low torque, high speed and high torque, low speed conditions, for example in earth moving applications. A two speed final drive may be provided for each of the tracks of a twin tracked vehicle, making possible the use of a conventional multi-speed transmission as the primary transmission.

The invention claimed is:

1. A final drive for a vehicle including a compound gear set, comprising:
   an input;
   an output; and
   a first and a second epicyclic gear set associated with the input and the output, each of the first and second epicyclic gear sets comprising
   a sun gear, at least one planet gear associated with the sun gear,
a planet carrier associated with the at least one planet gear, and
a ring gear associated with the at least one planet gear,
wherein the sun gear of the first epicyclic gear set is rotatably coupled with the ring gear of the second epicyclic gear set and the final drive is configured to selectively shift between a high ratio state and a low ratio state;
wherein the planet carrier of the first epicyclic near set is locked against rotation, the input is rotatably coupled to the sun gear of the second epicyclic gear set, and the output is rotatably coupled to the planet carrier of the second epicyclic gear set.

2. The final drive for a vehicle according to claim 1, wherein the sun gear and the ring gear of the first eplcycflc gear set are locked against rotation in the high ratio stats and wherein the planet carrier of the second epicyclic gear set is rotatably coupled to the ring gear of the first epicyclic gear set in the low ratio stat.

3. The final drive for a vehicle according to claim 2, wherein the final drive is configured to selectively operate in a neutral state in which the output is rotatably uncoupled from the first and a second epicyclic gear sets.

4. The final drive for a vehicle according to claim 2, including a sliding controller movable between a high ratio position to lock the sun gear and the ring gear of the first epicyclic gearset against rotation in the high ratio state and a low ratio position to rotatably couple the planet carrier of the second epicyclic gear set to the ring gear of the first epicyclic gear set.

5. The final drive for a vehicle according to claim 4, wherein the sliding controller is the first epicyclic ring gear.

6. The final drive for a vehicle according to claim 4, wherein the sliding controller includes splines co-operable with corresponding splines on the sun gear and the ring gear of the first epicyclic gear set, and co-operable with corresponding splines on the planet carrier of the second epicyclic gear set.

7. A drive train, comprising:
a transmission; and
at least one final drive according to claim 1, the final drive being operably associated with the transmission.

8. A tracked vehicle, comprising:
a track;
at least one final drive according to claim 1, the final drive being configured to drive the track to move the vehicle.

9. A compound gear set, comprising:
an input,
an output, and
a first and a second epicyclic gear set associated with the input and the output, each of the first and second epicyclic gear sets comprising
a sun gear,
at least one planet gear associated with the sun gear,
a planet carrier associated with the at least one planet gear, and
a ring gear associated with the at least one planet gear,
wherein the sun gear of the first epicyclic gear set is rotatably coupled with the ring gear of the second epicyclic gear set,
wherein the final drive is configured to be selectively operable between a high ratio state in which the sun gear and the ring gear of the first epicyclic gear set are locked against rotation and a low ratio state in which the planet carrier of the second epicyclic gear set is rotatably coupled to the ring gear of the first epicyclic gear set.

10. The compound gear set according to claim 9, wherein the planet carrier of the first epicyclic gear set is locked against rotation.

11. The compound gear set according to claim 9, wherein the compound gear set is operable between a neutral state in which the output is rotatably uncoupled from the first and second epicyclic gear sets.

12. The compound gear set according to claim 9, including a sliding controller movable between a high ratio position to lock the sun gear and the ring gear of the first epicyclic gear set against rotation in the high ratio state and a low ratio position to rotatably couple the planet carrier of the second epicyclic gear set to the ring gear of the first epicyclic gear set in the low ratio state.

13. The compound gear set according to claim 12, wherein the sliding controller is the first epicyclic ring gear.

14. The compound gear set according to claim 12, wherein the sliding controller includes splines co-operable with corresponding splines on he sun gear and the ring gear of the first epicyclic gear set, and co-operable with corresponding splines on the planet carrier of the second epicyclic gear set.

15. A drive train, comprising:
a transmission; and
at least one compound gear set according to claim 9, the compound gear set being configured to receive rotational input from the transmission.

16. A tracked vehicle, comprising:
a track; and
at least one compound gear set according to claim 9, the at least one compound gear set being operable to selectively drive the track to move the vehicle.

17. A final drive for a vehicle including a compound gear set, comprising:
an input shaft defining an axis;
an output;
a first and a second epicyclic gear set associated with the input and the output, each of the first and second epicyclic gear sets comprising
a sun gear,
at least one planet gear associated with the sun gear,
a planet carrier associated with the at least one planet gear, and
a ring gear associated with the at least one planet gear; and
a sliding controller moveable in an axial direction relative to the axis of the input shaft to interface with at least one of the first and second epicyclic gear sets to selectively shift the final drive between a high ratio state and a low ratio state.

18. The final drive of claim 17, wherein the sun gear and the ring gear of the first epicyclic gear set are locked against rotation when in the high ratio state, and wherein the planet carrier of the second epicyclic gear set is rotatably coupled to the ring gear of the first epicyclic gear set when in the low ratio state.

19. The final drive of claim 17, wherein the sun gear of the first epicyclic gear set is rotatably coupled with the ring gear of the second epicyclic gear set.

20. The final drive of claim 17, wherein the final drive is configured to selectively operate in a neutral state in which the output is rotatably uncoupled from the first and a second epicyclic gear sets.

21. The final drive of claim 17, wherein the sliding controller is the first epicyclic ring gear.

22. The final drive of claim 17, wherein the sliding controller includes splines co-operable with corresponding splines on the sun gear and the ring gear of the first epicyclic gear set, and co-operable with corresponding splines on the planet carrier of the second epicyclic gear set.

23. A tracked vehicle, comprising:
a track;
at least one final drive according to claim 17, the final drive being configured to drive the track to move the vehicle.

* * * * *